(12) United States Patent
Nasukawa et al.

(10) Patent No.: US 8,005,829 B2
(45) Date of Patent: Aug. 23, 2011

(54) TECHNIQUE FOR SEARCHING FOR KEYWORDS DETERMINING EVENT OCCURRENCE

(75) Inventors: Tetsuya Nasukawa, Fujisawa (JP); Shourya Roy, New Delhi (IN); L. Venkata Subramaniam, Gurgaon (IN); Hironori Takeuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 12/044,378

(22) Filed: Mar. 7, 2008

(65) Prior Publication Data
US 2008/0256063 A1    Oct. 16, 2008

(30) Foreign Application Priority Data
Mar. 8, 2007    (JP) ................. 2007-059088

(51) Int. Cl.
*G06F 7/00* (2006.01)
*G06F 17/30* (2006.01)
*G06Q 30/00* (2006.01)
(52) U.S. Cl. .............. 707/730; 707/765; 705/14.54
(58) Field of Classification Search ........... 707/999.001, 707/999.104, 999.107, 730, 765; 700/245; 705/14.54
See application file for complete search history.

(56) References Cited

U.S. PATENT DOCUMENTS

| | | | |
|---|---|---|---|
| 7,007,074 B2 * | 2/2006 | Radwin .................. | 709/217 |
| 7,548,915 B2 * | 6/2009 | Ramer et al. .............. | 705/14.54 |
| 7,702,635 B2 * | 4/2010 | Horvitz et al. ............. | 709/203 |
| 7,725,463 B2 * | 5/2010 | Hurst-Hiller et al. ......... | 707/723 |
| 7,734,451 B2 * | 6/2010 | MacArthur et al. .............. | 703/2 |
| 2004/0215430 A1 * | 10/2004 | Huddleston et al. .............. | 703/2 |
| 2005/0021490 A1 * | 1/2005 | Chen et al. ......... | 707/1 |
| 2005/0115561 A1 * | 6/2005 | Stahmann et al. ....... | 128/200.24 |
| 2005/0149229 A1 * | 7/2005 | Doi et al. ...................... | 700/245 |
| 2007/0010942 A1 * | 1/2007 | Bill .............................. | 701/209 |

OTHER PUBLICATIONS

Hisamitsu, et al, "Representativeness Based on the Number of Co-occurring Salient Words", Proceedings of the 19th Inter. Conf. on COLING, pp. 1-7, 2002.
Morgan, et al, "Automatically Detecting Action Items in Audio Meeting Recordings", 7th SIGdial Workshop on Discourse and Dialogue, pp. 96-103, 2006.
Zweig, et al, Automatic Analysis of Call-center Conversations, ICASSP, 2006.

* cited by examiner

*Primary Examiner* — Mohammad Ali
*Assistant Examiner* — Bao G Tran
(74) *Attorney, Agent, or Firm* — William Stock; Anne Vachon Dougherty

(57) ABSTRACT

A keyword search system including a text input unit for inputting subtexts obtained by dividing each text into parts, while associating the subtexts with an event through a process recorded in the text; a prediction device adjuster for adjusting a corresponding event prediction device to maximize the percentage of text in which the inputted event is identical to a prediction result in a first text group selected from the subtexts; a prediction processor for generating a prediction result for each section, by inputting each text in a second text group selected from the corresponding subtexts in the adjusted event prediction device; and a search unit for calculating the prediction precision for the second text group of the event prediction device using a comparison between the inputted event and the prediction result for each subtext, and searching for keywords in sections with a certain degree of prediction precision.

10 Claims, 14 Drawing Sheets

30-1

| Category | Item CLS ID | Item Agent Name | Item Call Type | Item Reason | Item Pick Up | Item IBM Car rental 1 | Item IBM Car rental 2 |
|---|---|---|---|---|---|---|---|
| Keywords | shamakar WAV 5D | Agent026 | reservation | | WHEN CAR WAS PICKED UP | | |
| Title | >Hi ! Ahh. Can i, can i make a reservation? | | | | | | |
| Text | Agent : greeting : Thank you for calling IBM Car Rental 2. my name is Person_Name. How may i help you?<br>Customer : cust_req:Hi ! Ahh.. Can i, can i make a reservation?<br>Agent : details:Sure. and from where would you like to pick up the car. Sir which location?<br>Customer : detai ls:Ahh.. Santa Person Name airport.<br>Agent : details:On what date and time?<br>Customer :details:Tonight.<br>Agent:details:And when would you like, tonight at what time Sir?<br>Customer : details:Ahhh..8 o'clock, would that work?<br>Agent : details:Are you flying into this location or are you a local renter.<br>Customer : details: I am local renter.<br>Agent : details:And when would you like to return it, on what date and time?<br>Customer : detai ls:Ahh.. Sunday evening<br>Agent : details:Ok! We.<br>Agent : rates:Have a standard car for you and that is something similar to a Chevy Impala and the total price for two days rental, you need to pay just $60.84 with all taxes and all surcharges included.<br>Customer : objection_handling:You know, i saw cheaper rates on your website. For the smallest car, Ahh. i don't need to have the Impala, i can have the sub-compact.<br>Agent:<br>objection_handling: It will cost you just $39.07 for two days rental<br>Customer : objection_handling: I ant sorry.<br>Agent : objection_handling: It wil l cost you just $39.07 with all taxes and all surcharges inc.<br>Customer : objection_handling:Person_name. M-O-R-E-N-O<br>Agent : objection_handl ing: The jf.<br>Agent : personal_details:The first name.<br>Customer : personal_details: Person_Name M-I-G-U-E-L.<br>Agent : person_details: Ok ! Mr. Person_Name. have you ever rented with us before?<br>Customer : personal_details: Ahhh.. with IBM Car Rental 2 yes.<br>Agent : personal_details:Ok! You need to be at least 25 with a clean driving record, a valid driver's license, a major credit card in your name. that is not a cheque card or debit card. You are picking up the car from the Orange Country airport around 8pm. You would like to return it on Sunday around the same time. You would require an Economy car. Can i have your phone number starting with the area code?<br>Customer : personal_details: \*\*\*\_\*\*\*\_\*\*\_\*\*<br>Agent : objection_handling:Your confirmation number would be. Ready?<br>Customer : objection_handlIng: Go ahead.<br>Agent : objection_handling:\*\*\*\*\*\*\*\*\*, I' I I<br>Customer :objection_handling:Ok. !<br>Agent : objection_handling: Ok! And do you kn<br>Customer : objection_handling: Yes. it's insi<br>Agent: conclusion:Yes its there anything else i can help you with Mr. Moreno?<br>Customer : conclusion:No. that' s gonna be it.<br>Agent : conclusion:Thank you for calling IBM Gar Rental 2, see you at the counter tomorrow. GoodDye! !<br>Customer : conclusion:Thank you ByBye! !. | | | | | | |

72 CALLS

| Category | Item CLS ID | Item Agent Name | Item Call Type | Item Reason | Item Pick Up | Item IBM Car rental 1 | Item IBM Car rental 2 |
|---|---|---|---|---|---|---|---|
| Keywords | shamakar WAV 5D | Agent057 | reservation | WHEN CAR WAS NOT PICKED UP | | | |
| Title | >Hi ! i am looking for car to | | | | | | |
| Text | Agent : greeting:welcome to IBM Car Rental 2 i am Person_Name, how may i help you today.<br>Customer : cust_req:Hi, i am looking for car to.<br>Agent:details:what location is granalo in the what date. mam. can you give me the date.<br>Customer_details: aa i come on 22 may.<br>Agent : details:ok. mam. aa later arrival what time you are arriving can you give me that.<br>Customer : details: aa that gonna be.<br>Agent : details:right. mam. late arrival is on request only i can make a reservation but it will be confirmed to you within 224 hrs the request wheather they will meet the request or not.<br>Customer : details:ok.<br>Agent : details:so you want me to go and tell you rates and every thing.<br>Customer : detai ls: yes.<br>Agent : details: when would you drop the car back.<br>Customer : details: aa the 24th around aa some where around 4 o clock<br>Agent : details: and what kind of car you are looking at<br>Customer : details a mid size.<br>Agent : rates:it will be 95 dollars and 79 cents including taxes and sir charges unlimited miles do you want me to reserve the car for you.<br>Customer : rates: ya.<br>Agent : personal_details: can i have your last name.<br>Customer : personal_details: fcill.<br>Agent : personal_details:scillwell.<br>Customer : personal_details: right.<br>Agent : personal_details:can you spell your first name and your phone number with your area code.<br>Customer : persona?details :*********<br>Agent : objection?handling:all right mam. we will contact you on this number on this number and bout wheather your request is confirmed or not.<br>Customer : objection_handling: ok.<br>Agent : objection_handling: and i would also like to tell you all the rental should atle.<br>Agent:checks : Person_Name be 25 with the valid license and clean driving record.<br>Customer : checks : ********<br>Agent : checks " yup.<br>Customer : checks : ok.<br>Agent : conclusion: Allrigh<br>customer conclusion: than    54 CALLS | | | | | | |

FIG. 3b

| | EVENT A | EVENT B |
|---|---|---|
| IMPROVED SECTION 1 (REMARKS 1-2) | make(5) reservation(6) rate(2)price(3) | make(2) reservation(1) rate(5)price(6) |
| IMPROVED SECTION 2 (REMARKS 15-20) | discount(10)club(7) | discount(6)club(3) |
| IMPROVED SECTION 3 (REMARKS 25-30) | clean driving record(4) | clean driving record(9) |

270

HYPERLINK

FIG. 9

| IMPROVED SECTION 1 | IMPROVED SECTION 2 | IMPROVED SECTION 3 |
|---|---|---|
| rate | number | credit |
| check | corprate program | credit card |
| make | contract | sir |
| return | card | clean driving record |
| tomorrow | have | valid driving license |
| see | economy | check |
| want | tax surcharge | counter |
| day | **\*mention of good rate** | start |
| airport | go | drive |
| look | AAA discount | card |
| assist | motor club | talk |
| reservation | leave | address |
| tonight | return | telephone |
| week | impala | reserve |

FIG. 10

Figure 12:
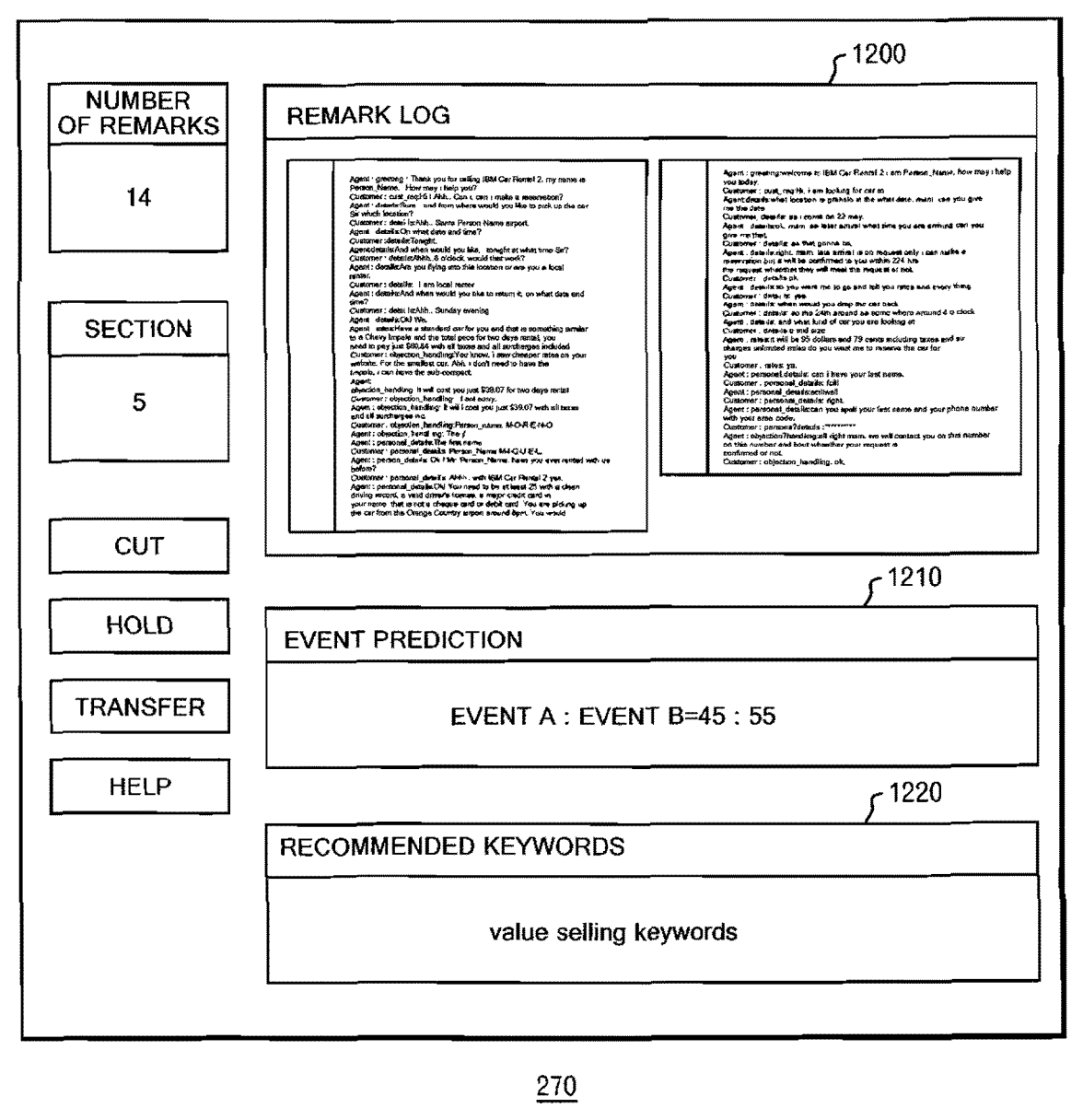

| NUMBER OF REMARKS | REMARK LOG |
|---|---|
| 14 | |

| SECTION |
|---|
| 5 |

| CUT |
|---|
| HOLD |
| TRANSFER |
| HELP |

1200

1210

EVENT PREDICTION

EVENT A : EVENT B = 45 : 55

1220

RECOMMENDED KEYWORDS value selling keywords

TECHNIQUE FOR SEARCHING FOR KEYWORDS DETERMINING EVENT OCCURRENCE

FIELD OF THE INVENTION

The present invention relates to a system, a program and a method for searching for keywords, and particularly relates to a system, a program and a method for searching texts for keywords determining an event occurrence, the texts each having a progress leading up to the event occurrence recorded therein.

BACKGROUND OF THE INVENTION

An example of a useful application of text mining is to predict an event which occurs through a process recorded in a text, by use of appearance frequencies of keywords in the text and the distribution of the appearance frequency of each keyword. Here, as an example, consider a case of receiving a reservation for a rental car on the telephone. In this case, if a text indicating the telephone conversation record includes certain keywords a large number of times, it is possible to judge whether or not the conversation successfully comes to an agreement on the reservation. In this way, when reservations are received thereafter, it is possible to obtain information on what type of keyword is needed in conversations in order to improve the rate of success in reservations, or what type of keyword is effective for what type of customer. Then, the insight can be used to implement a business strategy.

This technology is described, for instance, in the followings:

T. Hisamitsu and Y. Niwa, "A Measure of Term Representativeness Based on the Number of Co-occurring Salient Words", Proceedings of the 19th International Conference on Computational Linguistics (COLING), pp. 1-7, 2002;

Automatically Detecting Action Items in Audio Meeting Recordings, (W. Morgan, P-C. Chang, S. Gupta and J. M. Brenier), 7th SIGdial Workshop on Discourse and Dialogue, pp. 96-103, 2006; and G. Zweig, et. al, "Automatic Analysis of Call-center Conversations, ICASSP, 2006

These will be described later.

Various keywords are included in a text targeted for text mining. Accordingly, even if the appearance frequencies of all the keywords are calculated, useful insight may not be obtained due to too much information. For this reason, in order to efficiently obtain useful information by text mining, it is desirable to calculate the appearance frequency or appearance distribution of keywords in each category by categorizing the keywords. For example, in the case of a call center to receive telephone inquiries on products in a manufacturing industry, a category of a product failure and a plurality of keywords belonging to the category are previously set, and the appearance frequency of the keywords in the category is used for analysis. If the category and the keywords belonging to the category are determined, a text can be automatically analyzed up to a certain point to find what event relates to each keyword (refer to "A Measure of Term Representativeness Based on the Number of Co-occurring Salient Words").

Conventionally, a category and keyword belonging to the category in a text to be analyzed are carefully examined, discussed and determined by text-analysis experts. This approach is effective when a text to be analyzed is made according to a predetermined form such as a summary of a conversation. However, such a summary has to be manually created by, for example, an operator at a call center, and it thus requires time and costs. Accordingly, if a conversation record itself can be analyzed as an analysis target text through a text mining process, such time and costs can be cut down.

However, a conversation record itself includes not only the essential contents leading up to an event occurrence but also various pieces of information on greetings, repeating questions or misspeaking. Therefore, it is not easy even for the text-analysis experts to search for useful keywords which contribute to the analysis among those pieces of information. Moreover, in the case of a conversation record to be analyzed, while there are many similarities between a conversation record including an event occurrence and another conversation record including another event occurrence, only a slight difference may determine each event occurrence. This makes it more difficult to search for useful keywords for the analysis. If searching for the keywords is not possible, a category to which the keywords belong cannot be effectively determined.

As reference techniques, cited are "Automatically Detecting Action Items in Audio Meeting Recordings" and "Automatic Analysis of Call-center Conversations". These techniques aim to find, from texts, characteristic parts that determine an event occurrence through a process recorded in the texts. Furthermore, the basic ideas are to learn characteristics of parts that determine an event occurrence in texts, from learning data. The learning data are the ones in which certain parts of the texts are previously associated with the characteristic parts that determine the event occurrence in the texts. According to the learning data, the characteristic parts themselves, words before and after the characteristic parts, the appearance frequencies of parts of speech, the pitch of a corresponding voice, and the like are learned. By using the result obtained by the learning, a newly inputted text is searched to find parts which are similar to the learned characteristics, and the found parts are outputted as parts which contribute to the analysis. These techniques are based on the existence of the learning data where the characteristic parts are manually determined. After all, the experts require enormous amounts of time and cost in order to appropriately and sufficiently prepare such learning data.

Hence, an object of the present invention is to provide a system, a program and a method, which can solve the above problems. The object is achieved by the combinations of the characteristics described in the independent claims in the scope of claims. Furthermore, the dependent claims stipulate further useful concrete examples of the present invention.

SUMMARY OF THE INVENTION

In order to solve the above problems, in an embodiment of the present invention, provided is a system for searching a plurality of texts for keywords determining an event occurrence in a plurality of texts in the texts each having a progress leading up to the event occurrence recorded therein, includes:

a text input unit for inputting a plurality of subtexts while associating each of the subtexts with an event occurring through the process recorded in each of the texts, the subtexts obtained by selecting parts corresponding to each of a plurality of predetermined sections in each of the plurality of texts;

a plurality of event prediction devices provided corresponding to the plurality of sections respectively, the prediction devices each outputting a prediction result of an event occurring through the process recorded in the subtexts corresponding to the prediction device, the prediction result based on the appearance frequency of each word in the subtexts;

a prediction device adjuster for adjusting the event prediction device corresponding to each of the plurality of sections, so as to maximize the percentage of agreeing texts to a first text group selected from the plurality of corresponding subtexts, the agreeing texts each indicating the content in which the inputted event agrees with the prediction result;

a prediction processor for generating the prediction result for each of the plurality of sections, by selecting a second text group, which is different from the first text group, from the plurality of subtexts corresponding to the section, and then by inputting each text to the second text group in the adjusted event prediction device corresponding to the section; and a search unit for calculating the prediction precision for the second text group of the event prediction device of each of the sections, the prediction precision based on a comparison result between the inputted event and the prediction result for each subtext, for searching for keywords in a section which has a higher degree of prediction precision than a predetermined reference value, and for outputting the keywords.

Please note that the above summary of the invention does not cite all the characteristics necessary to the present invention, and sub-combinations of the groups of these characteristics can also be included in the invention.

BRIEF DESCRIPTION OF THE DRAWINGS

For a more complete understanding of the present invention and the advantage thereof, reference is now made to the following description taken in conjunction with the accompanying drawings.

FIG. 3a shows an example of a text 30-1.

FIG. 3b shows an example of a text 35-1.

FIG. 9 shows a first display example of a display 270.

FIG. 10 shows an example of the result obtained by a search by a search unit 240.

FIG. 12 shows a second display example of a display 270.

DETAILED DESCRIPTION OF THE PREFERRED EMBODIMENTS

Although descriptions will hereinafter be given of the present invention through an embodiment of the present invention, the following embodiment does not particularly limit the scope of claims, and all combinations of characteristics, which are described in the embodiment, are not necessarily essential to the solving means of the invention.

Figure 1:
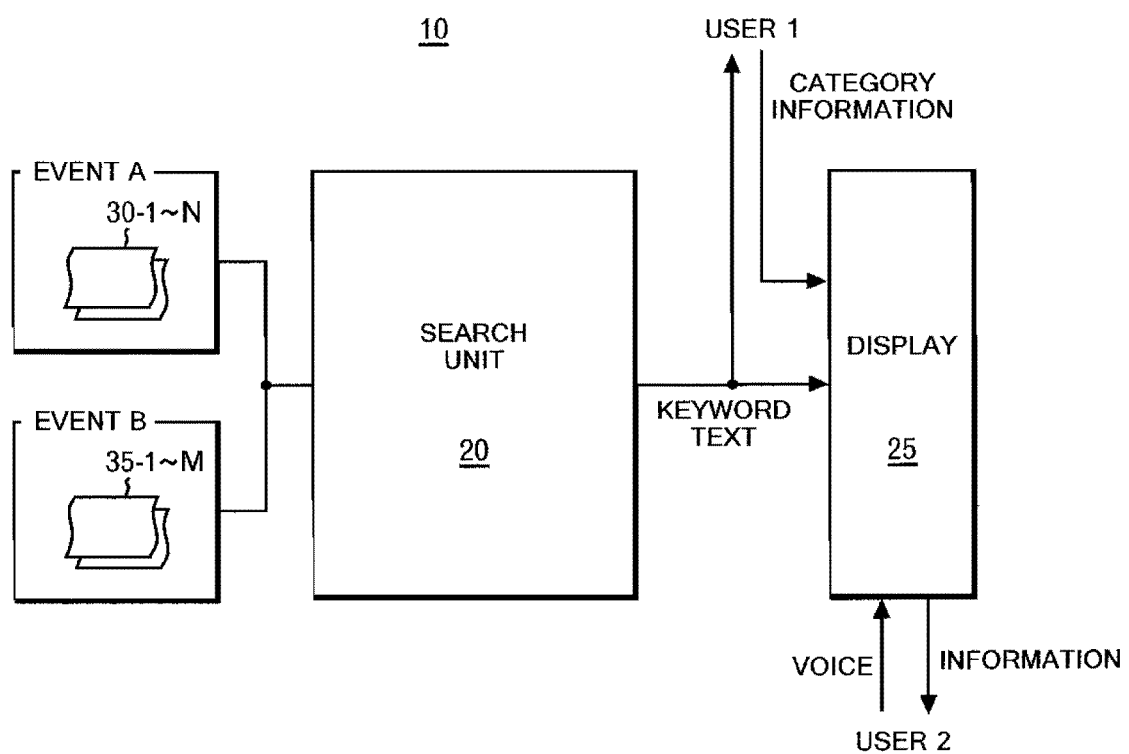
FIG. 1 shows the entire configuration of a search system 10 according to an embodiment.

FIG. 1 shows the entire configuration of a search system 10 according to the present invention. The search system 10 includes a search device 20 and a display 25. The search device 20 inputs texts 30-1 to N and texts 35-1 to M. The progress leading up to the occurrence of an event A is recorded in each of the texts 30-1 to N. The progress leading up to another event B is recorded in each of the texts 35-1 to M. Specifically, a conversation about a reservation for a rental car is recorded as the progress leading up to the events in each of the texts 30-1 to N and the texts 35-1 to M. In this case, the event A, for example, shows that the reserved car was picked up, and the event B, for example, shows that the reserved car was not picked up. In short, the texts 30-1 to N are the collections of the recorded conversations of when the reserved car was picked up, and the texts 35-1 to M are the collections of the recorded conversations of when the reserved car was not picked up. The types of events are not limited to the two of A and B, but there may be three or more types.

The search device 20 searches these inputted texts for a plurality of keywords which determine the occurrence of each event, and then outputs the plurality of searched keywords, together with these texts, to the display 25. The display 25 displays, for a user 1, the plurality of keywords received from the search device 20 while associating the keywords with the texts in which the keywords were searched for, and then receives the input of category information showing the category of the keyword for each of the displayed keywords. In this manner, a first object of the search system 10 is to help user input category information, not by displaying various words included in a text, but by displaying only characteristic words which determine the occurrence of the events.

In addition, the search device 20 may generate an event decision tree which shows whether or not what event is made easier to occur when what keyword appears, based on the category information and the keywords corresponding to the category information. In this case, after further receiving, from a user 2, the input of the voice data of conversations which successively progress, the display 25 may inform the user 2 what event easily occurs at the moment based on the voice data and the decision tree. In this manner, a second object of the search system 10 is to support the progress of the conversation which leads a desired event to occur. When applying the case to the example of the reservation for a rental car, it is possible to improve a probability that a reserved car is picked up.

Figure 2:
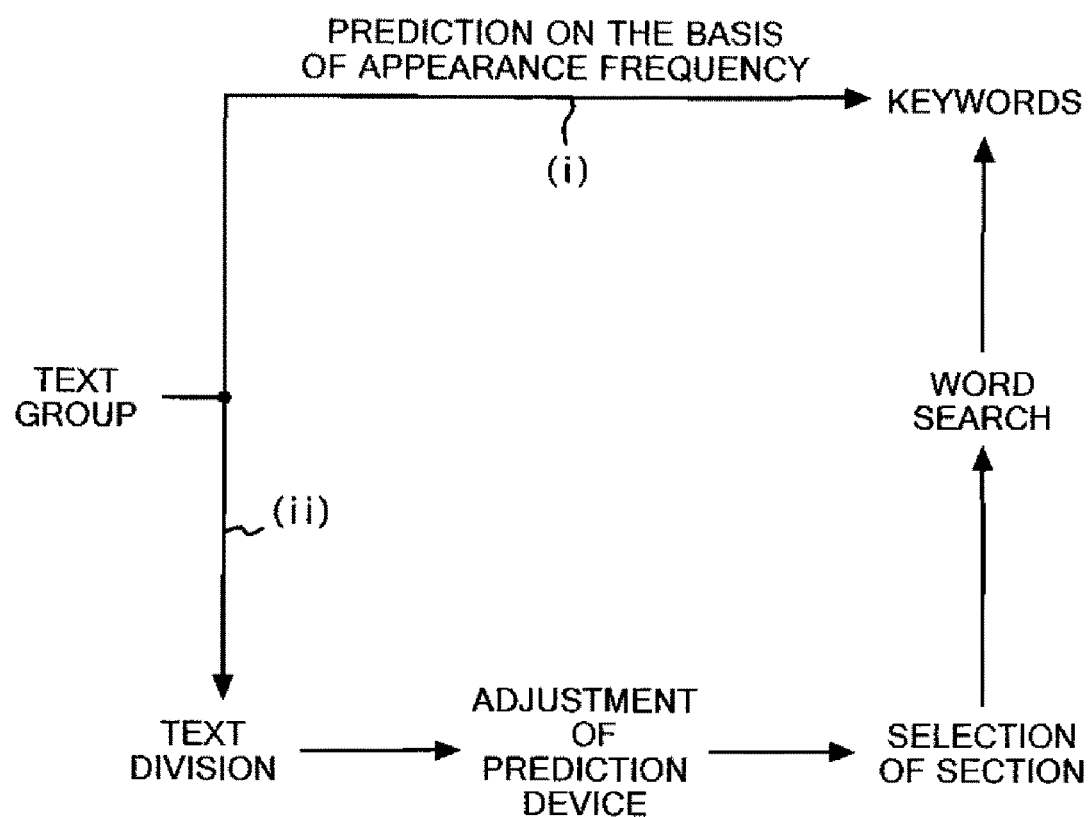
FIG. 2 shows two types of flows of processing for searching for keywords in contrast.

FIG. 2 shows two types of flows of processing for searching for keywords in comparison. The search device 20 can also search for keywords related to the occurrence of the event for each of the events with a certain degree of precision, according to the appearance frequency of each word which appears in the texts 30-1 to N, and the appearance frequency of each word which appears in the texts 35-1 to M (i). For example, words which frequently appear in the texts 30-1 to N and which do not appear very frequently in the texts 35-1 to M can be considered to be related to the occurrence of the event A. Such a simple comparison of frequencies may be effective when an inputted text includes only important information on a summary of the progress. However, when an inputted text is a conversation record and the like and includes various pieces of information, unnecessary words may be included in keywords to be searched.

In contrast, the search system 10 according to the present invention firstly divides each text into several parts for each section, and generates a plurality of subtexts for each. For example, when each text is one where a conversation is recorded, each subtext is one recorded conversation of a divided period from the start to the end of the conversation (ii). The search system 10 then causes an event prediction device, which is provided for each section and predicts an event according to the subtext, to learn. For example, the search system 10 may adjust the corresponding event prediction device for each section, to maximize a degree of prediction precision for a predetermined first text group among the plurality of corresponding subtexts.

Meanwhile, the search system 10 selects, for each section, a predetermined second text group among a plurality of corresponding subtexts. Moreover, the search system 10 inputs each text included in the second text group in the corresponding event prediction device, and generates the prediction result. The prediction result is compared with a previously inputted event, and the prediction precision is calculated. The search system 10 then selects the sections with a higher degree of prediction precision than a predetermined reference value, and searches useful keywords in each section.

As shown in the path (ii), the search system 10 automatically searches the sections where keywords to determine the occurrence of the events should be searched, and searches useful keywords in each section. In this manner, it is possible to narrow down an area to be searched for words and improve the search efficiency. Furthermore, it is possible to prevent unnecessary words from being mixed in by excluding sections which are unnecessary to be searched. Hereinafter, detailed descriptions will be given.

FIG. 3a shows an example of the text 30-1, and FIG. 3b shows an example of the text 35-1. Firstly, a title (Title), an agent (Agent), the type of phone call (Item Call Type), and the like are recorded in the texts 30-1 and 35-1 in order to help a user understand the contents when the texts are displayed later for the user. Additionally, the progress leading up to the occurrence of the events is recorded in chronological order in the text (Text) columns in the texts 30-1 and 35-1. Each line starting with Agent indicates an utterance of an agent who receives a reservation for a rental car, and each line starting with Customer indicates an utterance of a customer who makes a reservation for a rental car. Greeting or cust_req which follows Agent or Customer indicates a stage of a conversation in progress. Information at the stage in progress may be added manually during the conversation or after the end of conversation, or may be added automatically on the basis of the number of utterances.

Taking the text at the start of the conversation as an example, the customer says "Can I make a reservation? (can make a reservation?)" in the text 30-1 while the customer says "I am looking for a rental car (i am looking for car)." in the text 35-1. As can be seen, the contents are different. In addition, the customer inquires the grade and price of the car in the text 30-1 while such inquiries are few and the main subjects are the driving record and the like in the text 35-1. On the other hand, both of the texts 30-1 and 35-1 include various contents, such as an exclamation "Ahh" and a phone number, which are hard to say that they determine the occurrence of the event.

Please note that although the types of events to occur are different between the texts 30-1 and 35-1, it is possible to similarly categorize all the stages of the conversations in progress into greetings "greeting", a request "cus_req", details "details", and the like. Moreover, the position and order of each stage in the whole conversation in progress are also approximately the same. Furthermore, although the contents of the conversations of the texts 30-2 to N and the texts 35-2 to M are different, each text is one where the conversation is recorded in approximately the same form as those of the texts 30-1 and 35-1. Hence, the descriptions will be omitted.

Figure 4:
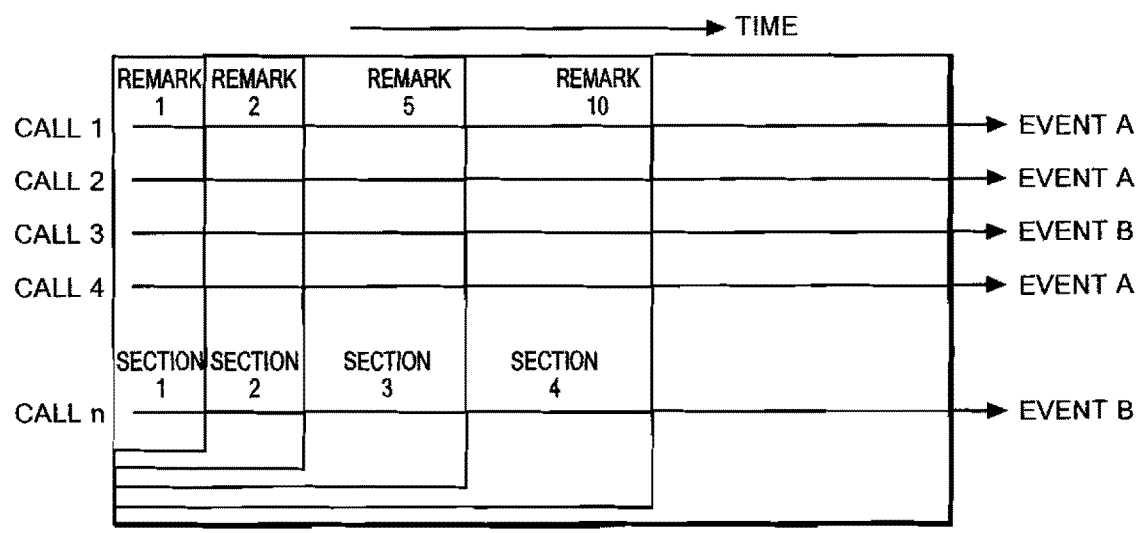
FIG. 4 shows a relation between the texts 30-1 to N and 35-1 to M and each subtext.

FIG. 4 shows a relation between the texts 30-1 to N and 35-1 to M, and each subtext. The search device 20 inputs the text which is previously divided into a plurality of subtexts, or divides the inputted text into several parts. With reference to FIG. 4, descriptions will be given of a relation between the text before the division and the subtexts after the division. Each of calls 1 to n show the texts recorded from the start to the end of the conversation. Each of the calls 1 to 2 and 4 are inputted while being associated with the event A. In other words, the calls 1 to 2 and 4 are any one of the texts 30-1 to N. On the other hand, each of the calls 3 and n are inputted while being associated with the event B. In other words, the calls 3 and n are any one of the texts 35-1 to M.

Horizontal axes conceptually show a time passage direction, and specifically show the number of utterances, for example. In addition, each call is separated by predetermined sections on the basis of the number of utterances. A section 1 corresponds to the first utterance, a section 2 corresponds to the first to second utterances, a section 3 corresponds to the first to fifth utterances, and a section 4 corresponds to the first to tenth utterances. The sections here correspond to the accumulated utterances in the conversation from the start of the conversation. In other words, each section corresponds to a plurality of periods starting at the head of the text to each of a plurality of predetermined points of time. Additionally, a subtext is one where the record of the conversation corresponding to each section is selected from the text. Each section may be set on the basis of the stage of the conversation in progress described with reference to FIGS. 3a and 3b. In other words, for example, the section 1 corresponds to a greeting stage, the section 2 to the greeting stage and a request stage, and the section 3 to the greeting stage, the request stage, and a details stage.

Figure 5:
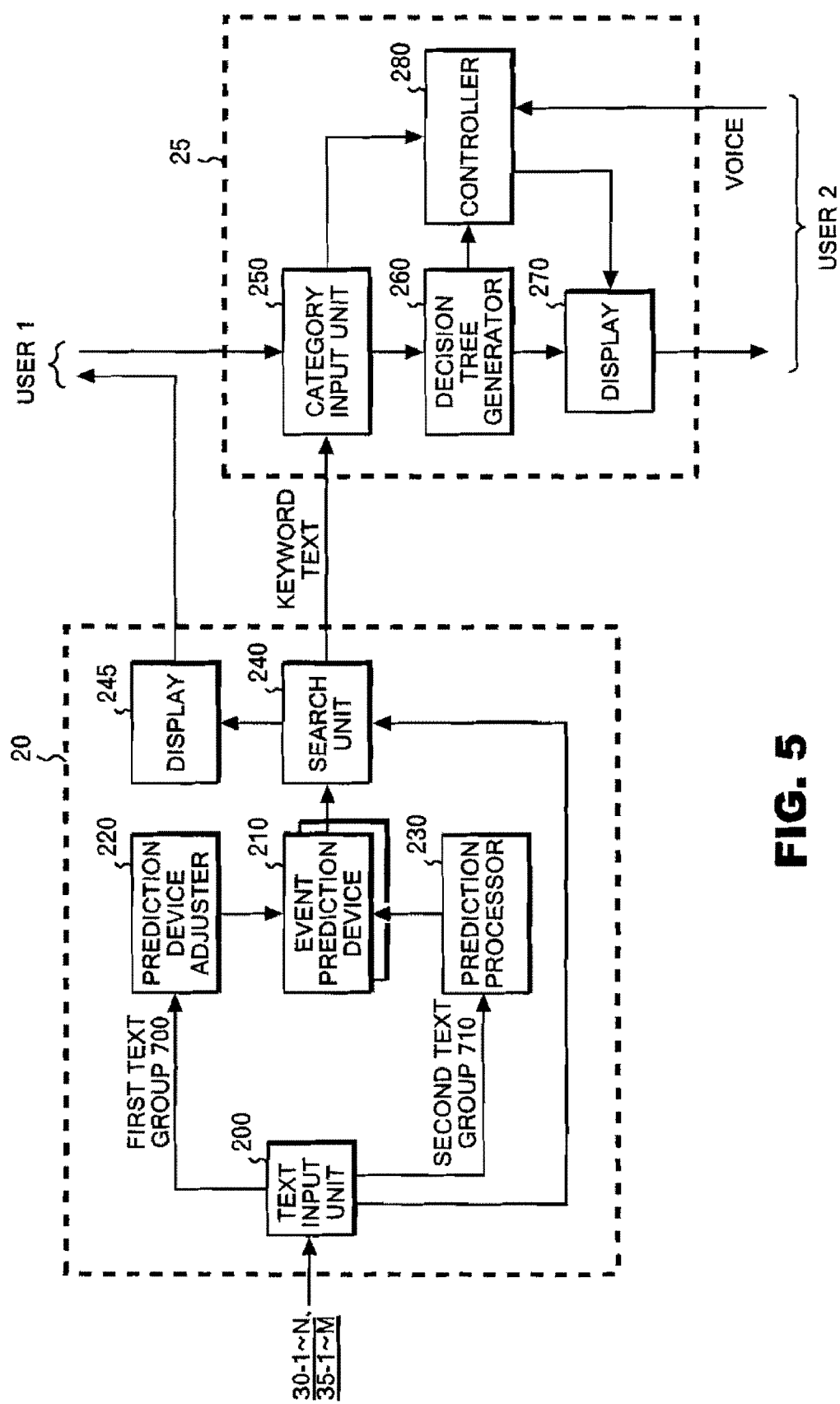
FIG. 5 shows the functional configurations of a search device 20 and a display 25.

FIG. 5 shows the functional configurations of the search device 20 and the display 25. The search device 20 functions as a text input unit 200, a plurality of event prediction devices 210, an prediction device adjuster 220, a prediction processor 230, a search unit 240 and a display 245, by causing a CPU 1000 and a RAM 1020, which will be described later, to cooperate with each other. The text input unit 200 inputs the plurality of texts while associating each of the texts with the events caused by the process recorded in the texts. The inputted text group associated with the event A is set to be the texts 30-1 to N, and the inputted text group associated with the event B is set to be the texts 35-1 to M. The text may be inputted as a group of the subtexts. In short, the text input unit 200 may input, instead of each text, the plurality of subtexts that parts corresponding to the plurality of sections previously determined by the text are selected.

Each of the event prediction devices 210 is provided while being respectively associated with one of a plurality of sections. The event prediction devices 210 output the prediction results of the events which occur through the process recorded in the corresponding subtexts, and the prediction results are based on the appearance frequency of each word in the subtexts. For example, a certain event prediction device 210 is provided to correspond to the section 1, and outputs the prediction result of the event which occurs through the process recorded in the subtext corresponding to the section 1, the prediction result based on the appearance frequency of each word in the subtext. The prediction device adjuster 220 adjusts the event prediction devices 210 which correspond to the respective sections. Specifically, the event prediction device 210 for each section is adjusted to maximize the percentage of agreeing texts to a first text group 700 selected from the plurality of corresponding subtexts, the agreeing texts indicating the contents in which events inputted by the text input unit 200 agree with the prediction results of the event prediction device 210. For example, the event prediction device 210 may have a parameter indicating a contribution ratio of the appearance frequency of each keyword to each event, and the prediction device adjuster 220 may adjust the parameter.

The prediction processor 230 selects a second text group 710, which is different from the first text group 700, from the plurality of corresponding subtexts, for each of the plurality of sections. Moreover, the prediction processor 230 inputs each text in the section of the second text group 710 in the already-adjusted event prediction device 210 corresponding to the section, for each section, and generates the prediction result. Furthermore, the search unit 240 calculates, for each section, the prediction precision for the second text group 710 of the event prediction device 210, using the result obtained by the comparing, for each subtext, the event inputted by the text input unit 200 and the prediction result of the event prediction device 210. The search unit 240 searches for keywords in the sections with a higher degree of prediction precision than the predetermined reference value. For example, the search unit 240 may search for keywords in subsequent sections where the prediction precision is improved compared with the former sections.

There are various methods for searching for keywords in sections determined in this manner. For example, the search unit 240 may search for keywords whose appearance frequencies are particularly improved in the section. In addition, the search unit 240 may search the text in the section for words for which the differences in appearance frequencies are larger than other words between the text corresponding to the first event and the text corresponding to the second event. While associating the keywords searched and the identification information of the section where the keywords were searched by the search unit 240 with the subtext corresponding to the section, the display 245 displays the subtext.

The display 25 has a category input unit 250, a decision tree generator 260, a display 270, and a controller 280. The category input unit 250 receives the input of category information showing the category of the keyword, for each keyword which is searched by the search unit 240 among the texts 30-1 to N and 35-1 to M. The decision tree generator 260 generates a decision tree which predicts an event on the basis of a text to be newly inputted. The decision tree sets each piece of category information to be a node, sets each of cases where the keywords corresponding to the category information appear and do not appear in the text to be newly inputted to be an edge, and sets each event to be a leaf node. The generated decision tree is outputted to the controller 280 and the display 270. The display 270 may display the decision tree for the user 2.

The controller 280 obtains the voice of the user 2 who is the speaker of the conversation in progress, and sequentially inputs each part of a text where the conversation is recorded, by recognizing the voice, for example. The controller 280 then calculates the appearance frequencies of keywords, which have already been searched for by the search unit 240 as those to determine each event, in the texts to be sequentially inputted. The controller 280 then calculates index values showing possibilities leading up to each event as the results of the conversations in progress, on the basis of the frequencies. In addition, the controller 280 may generate keywords to be spoken on the basis of the appearance frequency of each keyword in order to lead to the predetermined event. The keywords are generated according to the decision tree generated by the decision tree generator 260 and the keywords that have already appeared in the texts to be sequentially inputted. Following this, the display 270 displays at least one of these index values and keywords, for the user 2.

Figure 6:
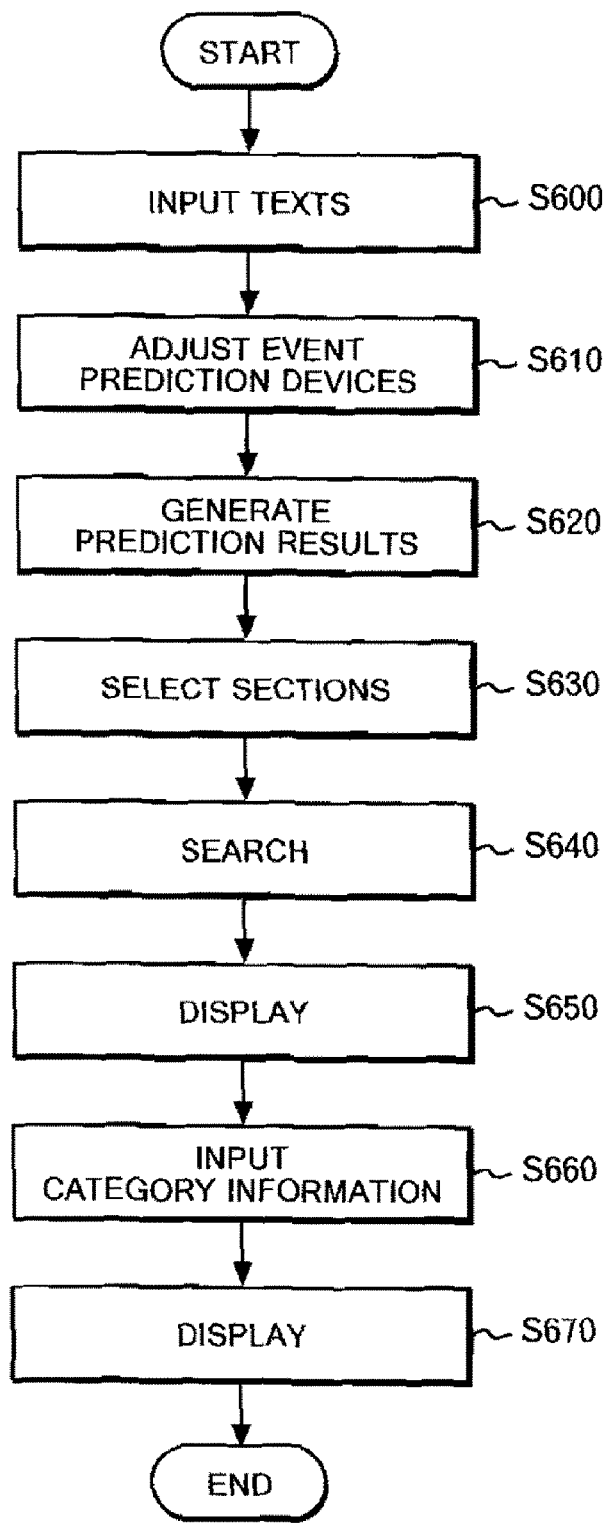
FIG. 6 shows a flow of processing that the search system 10 searches the texts for the keywords.

FIG. 6 shows a flow of processing that the search system 10 searches the texts for the keywords. The text input unit 200 inputs each of the plurality of texts while associating the texts with the events which occur through the process recorded in the texts (S600). The text may be inputted as a group of the subtexts. In other words, the text input unit 200 may input the plurality of subtexts obtained by selecting the parts corresponding to the plurality of predetermined sections from the text instead of each text. The prediction device adjuster 220 adjusts the event prediction device 210 corresponding to each of the plurality of sections (S610). Specifically, the event prediction device 210 for each section is adjusted to maximize the percentage of the text in which the event inputted by the text input unit 200 is identical to the prediction result of the event prediction device 210 among the first text group 700 selected from the plurality of corresponding subtexts.

The prediction processor 230 selects the second text group 710, which is different from the first text group 700, from the plurality of corresponding subtexts, for each of the plurality of sections. The prediction processor 230 then inputs, for each section, each text in the second text group 710 in the section in the already-adjusted event prediction device 210 corresponding to the section, and generates the prediction result. Descriptions will be given of a method for selecting the first text group 700 and the second text group 710, with reference to FIG. 7.

Figure 7:
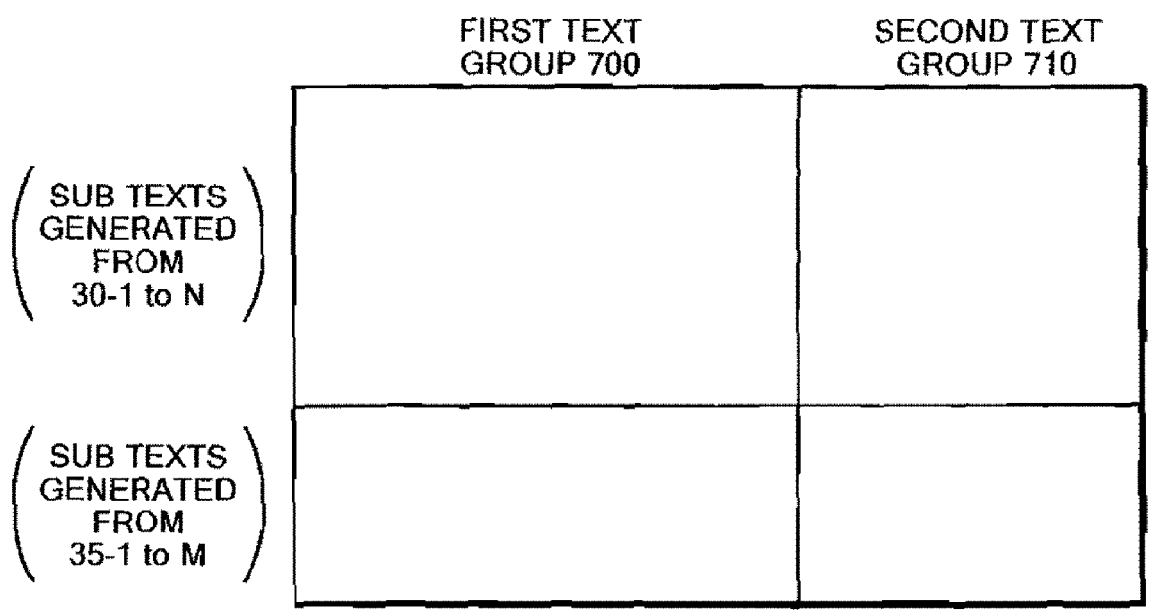
FIG. 7 shows a summary of the result obtained by categorizing subtexts generated from the texts 30-1 to N and the texts 35-1 to M into a first text group 700 and a second text group 710, respectively, for a certain section.

FIG. 7 shows a summary of the result obtained by categorizing subtexts generated from the texts 30-1 to N and the texts 35-1 to M into the first text group 700 and the second text group 710, respectively, for a certain section. The first text group 700 is randomly selected by the prediction device adjuster 220 from the plurality of corresponding subtexts for each of the plurality of sections. As a result, the first text group 700 includes texts corresponding to the event A and texts corresponding to the event B at approximately the same percentage as those of the texts 30-1 to N and the texts 35-1 to M. Similarly, the second text group 710 is randomly selected by the prediction processor 230 from the plurality of subtexts from which the first text group 700 is excluded, for each of the plurality of sections. As a result, the second text group 710 includes texts corresponding to the event A and texts corresponding to the event B at approximately the same percentage as those of the texts 30-1 to N and the texts 35-1 to M. Please note that the first text group 700 and the second text group 710 may not overlap with each other as shown in FIG. 7, or may share a part of the subtexts.

Figure 8:
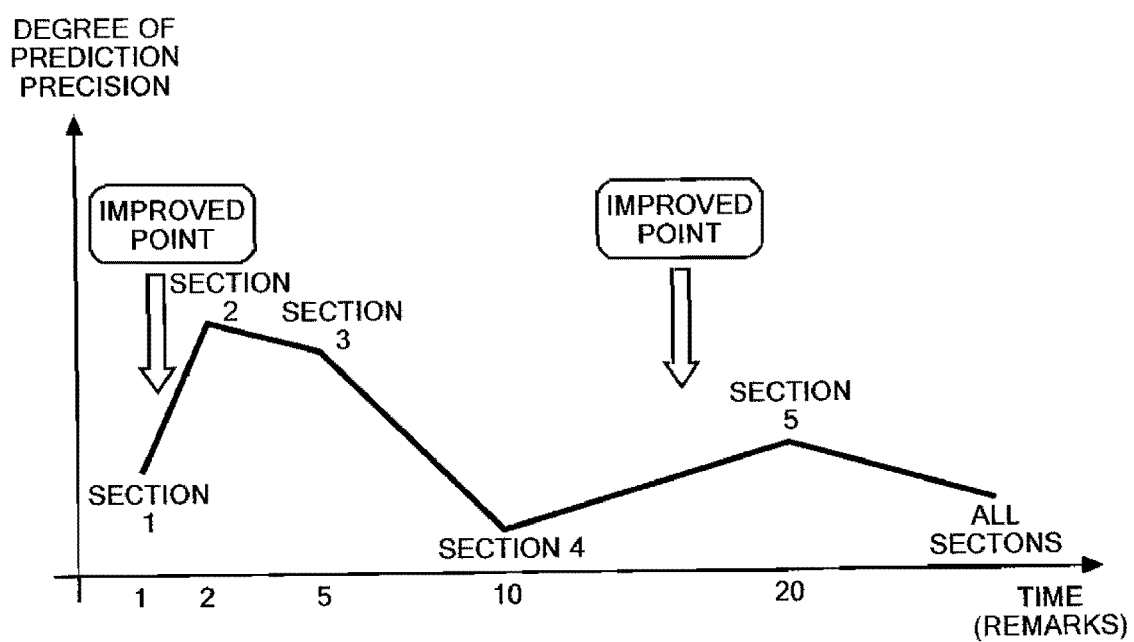
FIG. 8 shows a transition of the prediction precision for an event prediction device 210.

The descriptions return to FIG. 6. The search unit 240 calculates, for each section, a prediction precision of the second text group 710 of the event prediction device 210, on the basis of the result obtained by comparing, for each subtext, the event inputted by the text input unit 200 and the prediction result of the event prediction device 210 (S630). The search unit 240 then searches for keywords in the sections with a higher degree of prediction precision than the predetermined reference value. The search unit 240 may determine the sections based on the transition of the prediction precision with the passage of time, when each text is data where conversations leading up to the events are recorded in chronological order. For example, when each section indicates the time accumulated from the start of the conversation, the search unit 240 searches for keywords in the section where the first section is excluded from the second section, on condition that a prediction precision calculated for the second section including the first section is higher than the prediction precision calculated for the first section. FIG. 8 shows one of the examples.

FIG. 8 shows a transition of a prediction precision for the event prediction device 210. The prediction precision for the section 2 is improved compared with the section 1. Therefore, there is a strong possibility that the text where the section 1 is excluded from the section 2 includes the sufficient keywords to effectively adjust the event prediction device 210, that is, the keywords to determine the occurrence of the event. Similarly, there is a strong possibility that the text where the section 4 is also excluded from the section 5 includes the sufficient keywords to effectively adjust the event prediction device 210, that is, the keywords to determine the occurrence of the event. Hence, the search unit 240 searches for the keyword between the section where the section 1 is excluded from the section 2 and the section where the section 4 is excluded from the section 5.

As methods for searching for keywords in the sections to be searched, the following three are cited.

(1) A Method Based on the Transition of the Number of Word Appearances with the Passage of Time A section i where the prediction precision is improved is represented as $D_i$, and the text length of the section i is represented as $L(D_i)$. The text length of the section i may be the number of utterances in the section i, for example. In this case, if the case is applied to the example of FIG. 4, the result is $L(D_1)=1$, $L(D_2)=2$, $L(D_3)=5$, and $L(D_4)=10$. Meanwhile, the number of the appearances of a word wj in a text corresponding to the section i is fwj (i). Then, the search unit 240 calculates the following index value con for the word wj which is fwj (i)>0.

$$con(wj)=\{(fwj(i)-fwj(i-1))/fwj(i)\}/\{(L(D_i)-L(D_{i-1})/L(D_i))\}$$

The search unit 240 makes a search while setting words whose index value con is one or greater to be keywords. In other words, the search unit 240 makes a search, while setting, as the keywords, words having an increase rate in the number of appearances in the section i in relation to the section i-1 than an increase percentage of the text of the section i which is an example of the second section in relation to the section i-1 which is an example of the first section. Instead of this, the search unit 240 may search while setting, as keywords, each of predetermined number of words in order of decreasing index values. According to this method, words strongly related to a specific stage of a conversation in progress can be searched for as words with strong possibilities to determine an event caused by the whole conversation.

(2) A Method Based on the Difference in Appearance Frequencies of Words

The search unit 240 firstly categorizes the plurality of texts corresponding to the sections to be searched where the section i-1 included in the section i with the improved prediction precision is excluded from the section i, in accordance with the types of events occur through the process recorded in the texts. For example, the texts are categorized into a text group corresponding to the first event and a text group corresponding to the second event. The search unit 240 then calculates the index value showing the difference appearance frequencies between the text corresponding to the first event and the text corresponding to the second event, for each word appearing in the section to be searched. The index value to be calculated is likelihood rate statistics, chi-square statistics, or the like. Since such methods for calculating an index value has publicly been known, the descriptions will be omitted. The search unit 240 then sets words whose calculated index values are higher than a predetermined reference value as keywords which determine the occurrence of the events. Instead of this, the search unit 240 may search while setting each of predetermined number of words in order of decreasing index value as keywords, respectively. In this method, it is possible to search for words strongly related to the occurrence of any one of the events.

(3) Combination of the Above (1) and (2)

The search unit 240 may select keywords which should be searched for by combining the above (1) and (2). For example, the search unit 240 may calculate the above index value showing the difference in appearance frequency, only for words whose index value con mentioned above is greater than the predetermined reference value. On the other hand, the search unit 240 may calculate the above index value con, only for words whose index value mentioned above which shows the difference in appearance frequency is greater than the predetermined reference value. Instead of this, the search unit 240 may calculate, for each word, an evaluation value taking a larger value in accordance with the above index value con and taking a larger value in accordance with the above index value showing the difference in appearance frequency, and may search while setting the words with larger calculated evaluation values as the keywords.

The descriptions return to FIG. 6. Next, the display 245 associates the keywords searched by the search unit 240 and the identification information of the sections where the keywords have been searched with the subtexts corresponding to the sections, and displays the subtexts (S650). FIG. 9 shows an example thereof.

FIG. 9 shows a first display example of the display 270. The display 270 firstly displays the keywords searched among the text leading up to the occurrence of the event A and the keywords searched among the text leading up to the event B, for each section with the improved prediction precision, as shown in the left of the drawing. The identification information of the sections, for example, improved sections 1, 2, 3, and the like, may be associated with the respective sections with the improved prediction precision, in order to be displayed. In addition, the numbers of utterances included in each section, such as utterances 1 to 2, utterances 15 to 20, and utterances 25 to 30, may be displayed.

Moreover, the display 270 may display the searched keywords while associating the keywords with numerical values showing the frequency or the number of appearances of the keywords. For example, a keyword "make" is displayed as numeric values showing the frequency or the number while being associated with a numeric value of five in terms of the text corresponding to the event A and a numeric value of two in terms of a text corresponding to the event B. Furthermore, the display 270 displays the keywords while the respective keywords are set to have hyperlinks to texts including the keywords. For example, when a keyword of reservation, which corresponds to the event A, is clicked, the display 270 displays a part including the keyword of reservation and corresponding to the section 1, in the text corresponding to the event A.

In this manner, it is possible to make the subsequent operations of a user (such as inputting category information) more efficient, by systematically arranging the keywords based on the events and the sections, and displaying the keywords.

The descriptions return to FIG. 6. The category input unit 250 accepts the input of category information showing the category of the keyword, for each keyword searched by the search unit 240 among the texts 30-1 to N and the texts 35-1 to M (S660). Descriptions will be given of the association of category information and keywords with reference to FIG. 10.

FIG. 10 shows an example of the result obtained by a search by the search unit 240. Keywords such as rate, check, make, return, and tomorrow are detected by the search unit 240 according to the present invention from the text corresponding to the improved section 1. Moreover, the number of searched keywords is a little bit over ten, which is very small. Therefore, the user 1 who looked at this can easily decide where to categorize the keywords after making up a phrase such as "make reservation." As an example, the user 1 can input the category information of "a customer's intention at the start of a call (customer intent at start of call)" while associating the category information with "make a reservation," "check rate," and "want to see the rate."

Please note that the keywords shown in bold type in FIG. 10 are examples of keywords which have been associated by the user 1 with the category information. For example, "corporate program," "contract," "AAA discount," and "motor club" are associated with the category information of "discount-related expressions (discount relating expressions)." In addition, "clean driving record," and "valid driving license," and "credit card" are associated with the category information of "customer's qualifications (customer qualification)."

The descriptions return to FIG. 6. The display 25 may put on each type of display in order to help the user 2 develop the conversation, based on the keywords which have been associated with the category information in this manner (S670). Descriptions will be given of specific examples thereof with reference to FIGS. 11 and 12.

Figure 11:
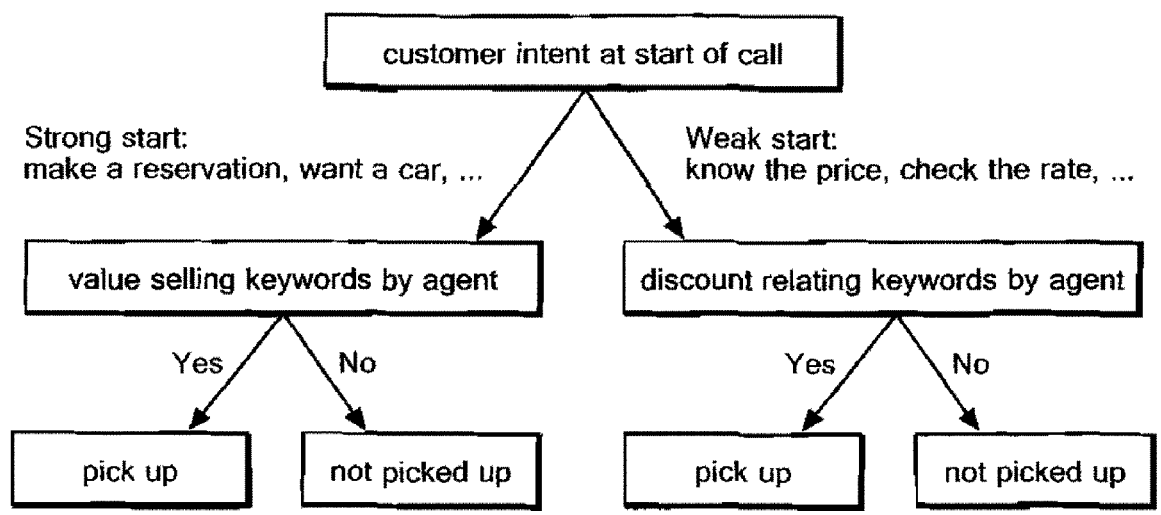
FIG. 11 shows an example of an event decision tree generated by a decision tree generator 260.

FIG. 11 shows an example of an event decision tree generated by the decision tree generator 260. The decision tree generator 260 generates an event decision tree generated from a text to be newly inputted. In the event decision tree, each piece of the category information is set to be a node, cases where the keywords corresponding to the category information appear/do not appear in the text to be newly inputted are set to be edges respectively, and each event is set to be a leaf node. Specifically, FIG. 11 is a binary decision tree, and shows the category information corresponding to a node in a rectangle which indicates to be the node. Moreover, an edge outputted from each node is associated with whether or not the keyword of the category information corresponding to the node appeared in the text, or what kind of keyword appeared if it did. Such a binary decision tree can be configured by a technique called machine learning, based on many data where events are associated with texts in which conversations are recorded, if category information and keywords associated with the category information are provided.

This binary decision tree provides the following insight intuitively. In a conversation in which direct objects such as "make a reservation (make a reservation)" or "want a car (want a car)" appear (strong start), "keywords related to selling values (value selling keyword)" is effective to achieve the pickup of a car (pick up). On the other hand, in a conversation in which indirect enquiries such as "want to know the price (know the price), or "check the rate (check the rate)" appear (weak start), "keywords related to discounts (discount relating keywords)" are effective to achieve the pickup of a car (pick up).

The display 270 may display information for the user 2 based on such a binary decision tree, and may realize the conversation support by the user 2. FIG. 12 shows an example thereof.

FIG. 12 shows a second display example of the display 270. The display 270 displays a text showing a conversation log which successively develops, in a conversation log window 1200. In addition, the display 270 displays an index value which shows a possibility to lead up to each event as a result of the conversation in progress in an event prediction window 1210. For example, the controller 280 can judge which of the events A and B occurs when a text in which the developing conversation is recorded is inputted in the binary decision tree shown in FIG. 11. This case is either 100%:0% or 0%:100%. However, it is possible to calculate the possibility to lead up to each event by using a multiway tree instead of the binary decision tree, or by assigning the possibility to lead up to each event to a leaf node as a probability value.

Furthermore, the display 270 may display keywords which should be uttered in order to lead up to the occurrence of a previously designated event in a recommendation window 1220. After only paths which lead up to the previously designated event are selected from the binary decision tree, these keywords can be found by excluding keywords which have already appeared in a conversation from on the paths. Consequently, it is possible for the user 2 who looked at this to easily judge where to direct a conversation, for example, whether to sell values (value selling). Please note that the display 25 may automatically return a phrase including these keywords to a customer instead of displaying the keywords in the recommendation window 1220, when the display 25 is an automatic response system of a conversation.

Figure 13:
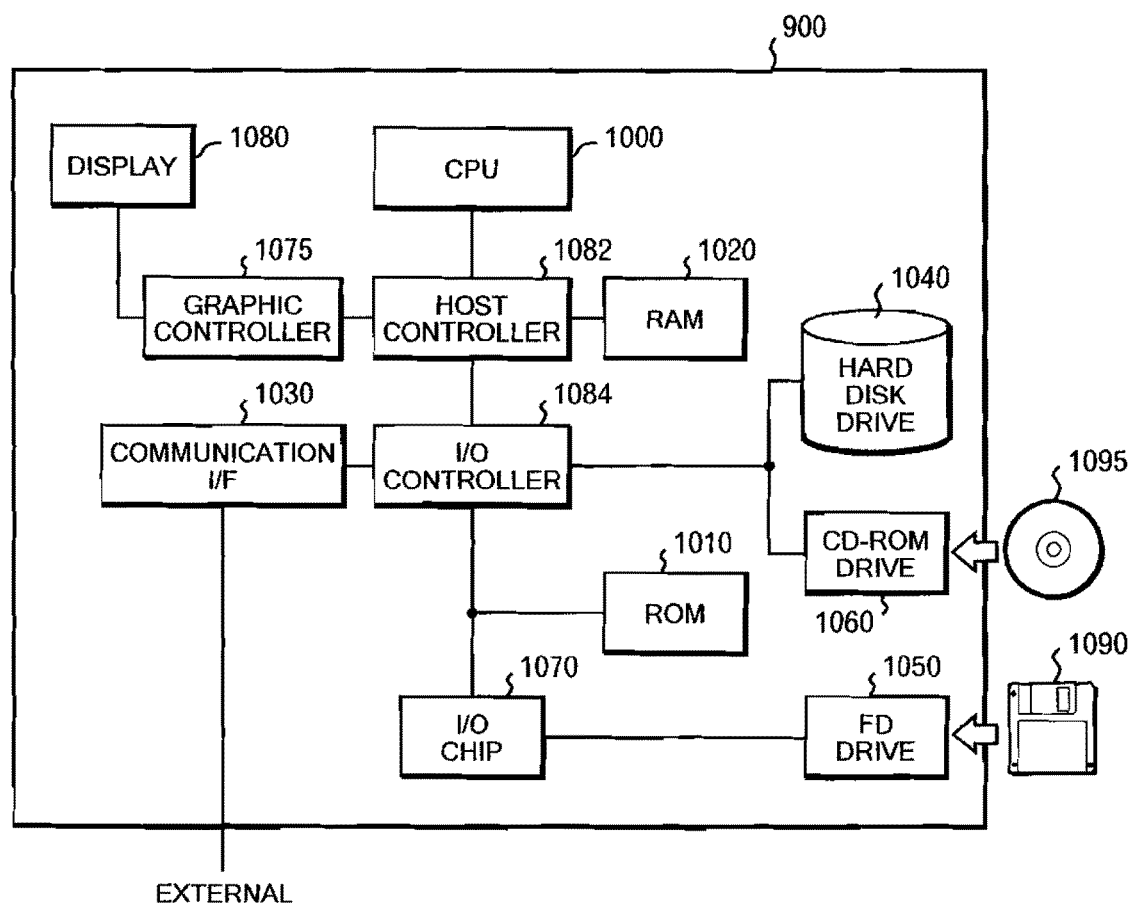
FIG. 13 shows an example of a hardware configuration of a computer 900 which functions as the search system 10.

FIG. 13 shows an example of a hardware configuration of a computer 900 which functions as the search system 10. The computer 900 includes: CPU peripherals having the CPU 1000, the RAM 1020, and a graphic controller 1075, which are mutually connected by a host controller 1082; an input/output unit having a communication interface 1030, a hard disk drive 1040, and a CD-ROM drive 1060, which are connected by an input/output controller 1084 to a host controller 1082; and a legacy input/output unit having a ROM 1010, a flexible disk drive 1050, and an input/output chip 1070, which are connected to the input/output controller 1084.

The host controller 1082 connects the RAM 1020, the CPU 1000 which accesses the RAM 1020 at a high transfer rate, and the graphic controller 1075. The CPU 1000 runs based on a program stored in the ROM 1010 and the RAM 1020 to control each unit. The graphic controller 1075 obtains image data which is generated by the CPU 1000 and the like on a frame buffer provided in the RAM 1020, and causes the data to be displayed on a display 1080. Instead of this, the graphic controller 1075 may include the frame buffer to store image data generated by the CPU 1000 and the like therein.

The input/output controller 1084 connects the host controller 1082 to the communication interface 1030 being a relatively high-speed input/output device, the hard disk drive 1040, and the CD-ROM drive 1060. The communication interface 1030 communicates with external devices via networks. The hard disk drive 1040 stores programs and data, which are used by the computer 900. The CD-ROM drive 1060 reads the programs and the data off a CD-ROM 1095, and provides them to the RAM 1020 or the hard disk drive 1040.

Furthermore, the input/output controller 1084 is connected to relatively low-speed input/output devices such as the flexible disk drive 1050, the input/output chip 1070, and the like. The ROM 1010 stores a boot program to be executed by the CPU 1000 upon the boot-up of the computer 900 and programs dependent on the hardware of the computer 900. The flexible disk drive 1050 reads programs or data off a flexible disk 1090, and provides them to the RAM 1020 or the hard disk drive 1040 via the input/output chip 1070. The input/output chip 1070 connects the flexible disk 1090 and each type of input/output devices via, for example, a parallel port, a serial port, a keyboard port, a mouse port, and the like.

Programs provided to the computer 900 are provided by users by being stored in a recording medium such as the flexible disk 1090, the CD-ROM 1095, or an IC card. The programs are executed by being read off the recording medium and being installed in the computer 900. The operations that the programs cause the computer 900 and the like to perform are the same as those in the search system 10 described in FIGS. 1 to 12. Hence, descriptions thereof will be omitted.

The programs shown above may be stored in external recording media. As the recording media, it is possible to use an optical recording medium such as a DVD or a PD, magneto-optical recording medium such as an MD, a tape medium, a semiconductor memory such as an IC card, and the like, other than the flexible disk 1090 and the CD-ROM 1095. Additionally, the programs may be provided to the computer 900 via networks by using a storage device such as a hard disk or a RAM, which are provided in a server system connected to a dedicated communication network and the internet as a recording medium.

As described above, the search system 10 according to the embodiment can efficiently search texts in free forms, such as the record of a conversation, for keywords to determine the occurrence of an event. A search target can be one where a conversation is recorded as it is. Accordingly, the search is efficient since advance operations such as the creation of a summary are made unnecessary. In addition, an area to be searched for keywords is judged based on the transition of precision of a prediction device for predicting the occurrence of an event. Moreover, since appropriate adjustments are made by texts targeted for the prediction device, there is no need to manually and previously adjust the prediction device. Hence, the search is efficient. Furthermore, according to the demonstration done by the inventor of this application, it is confirmed that it is possible to search actual conversation data for useful keywords with a high degree of precision.

Although the descriptions have been given in the above by use of the embodiment of the present invention, the technical scope of the present invention is not limited to the scope described in the above embodiment. It will be apparent to those skilled in the art that it is possible to add various changes or improvements to the above embodiment. For example, various different examples are conceivable as the progress leading up to the occurrence of the event which is recorded in the text 30-1. Specifically, the text 30-1 or 35-1 may be a progress report about the financial status of a company. In this case, an event occurring through the progress of the record of the report is one which shows whether the company goes bankrupt or survives. Further, as another example, the text 30-1 or 35-1 may be a test report about a medicine. In this case, an event means whether or not the medicine has a strong effect on a specified disease. As represented by such examples, the search system 10 according to the embodiment makes it possible to predict the occurrence of an event in a wide range of field from as the bankruptcy of a company to the effects of a medicine. It is apparent from the descriptions in the scope of claims that embodiments to which such changes or improvements are added can be included in the technical scope of the present invention, too.

What is claimed is:

1. A system for searching a plurality of texts of recorded conversations to determine keywords leading to an event occurrence in a plurality of texts wherein the texts each have a progress leading up to the event occurrence recorded therein, comprising:
    a processing device for executing units;
    a text input unit for inputting a plurality of subtexts while associating each of the subtexts with an event occurring through the process recorded in each of the texts, the subtexts obtained by selecting parts corresponding to each of a plurality of predetermined sections in each of the plurality of texts;
    a plurality of event prediction devices corresponding to the plurality of sections respectively, the prediction devices each outputting a prediction result of an event occurring through the process recorded in the subtexts corresponding to the prediction device, the prediction result based on the appearance frequency of each word in the subtexts;
    a prediction device adjuster for adjusting the event prediction device corresponding to each of the plurality of sections, so as to maximize the percentage of agreeing texts to a first text group selected from the plurality of corresponding subtexts, the agreeing texts each indicating the content in which the inputted event agrees with the prediction result;
    a prediction processor for generating the prediction result for each of the plurality of sections, by selecting a second text group, which is different from the first text group, from the plurality of subtexts corresponding to the section, and then by inputting each text of the second text group in the adjusted event prediction device corresponding to the section; and
    a search unit for calculating the prediction precision for the second text group of the event prediction device of each of the sections, the prediction precision based on a comparison result between the inputted event and the prediction result for each subtext, for searching for keywords in a section which have a higher degree of prediction precision than a predetermined reference value, and for outputting the keywords,
    wherein the prediction device adjuster randomly selects the first text group from the plurality of subtexts corresponding to each of the plurality of sections, and
    the prediction processor selects, as the second text group, some of the plurality of subtexts corresponding to each of the plurality of sections, by excluding the first text group from the subtexts.

2. The system according to claim 1, wherein
    each of the plurality of texts is one in which the progress leading up to the event occurrence is recorded in chronological order,
    the text input unit inputs records of a plurality of periods as the plurality of subtexts, the records selected from each of the texts, the records each corresponding to a period from the head of the text to one of a plurality of predetermined points of time, and
    the search unit searches for keywords in a section where a first section is excluded from a second section including the first section, on condition that the calculated prediction precision for the second section is higher than that of the first section.

3. The system according to claim 2, wherein the search unit makes a search while setting, as the keywords, words having the number of appearances whose increasing rate of the second section to the first section is higher than the increasing rate of the text volume in the second section to that in the first section.

4. The system according to claim 2, wherein the search unit searches a plurality of texts corresponding to the section where the first section is excluded from the second section, while setting, as the keywords, words having the appearance frequencies that are different between texts corresponding to a first event and a second event to a larger extent than the other words.

5. The system according to claim 4, wherein the search unit calculates an evaluation value of each word, the evaluation value taking a larger value according to the increasing rate of the number of appearances in the second section to that in the first section and taking a larger value according to the difference between the frequencies, and makes a search while setting words with larger calculated evaluation values as the keywords.

6. The system according to claim 1, further comprising a display for displaying the subtexts corresponding to a section, while associating the subtexts with the keyword searched out by the search unit and identification information of the section searched for the keywords.

7. The system according to claim 4, further comprising:
a category input unit for receiving the input of category information which shows the category of each keyword searched out by the search unit; and
a decision tree generator for generating a decision tree for predicting an event using a text newly inputted, the decision tree including a node, an edge and a leaf node, the node indicating each piece of category information, the edge indicating whether or not a keyword corresponding to the category information appears in the text, and the leaf node indicating each event.

8. The system according to claim 1, the system facilitating a conversation leading to an occurrence of a desired event, the system further comprising:
a category input unit for receiving the input of category information which shows the category of each keyword searched out by the search unit from an already-inputted text;
a controller for sequentially inputting parts of a text in which a conversation in progress is recorded, and for generating at least one of an index value indicating the possibility of an occurrence of each event, and a keyword that should be spoken in order for a desired event to occur, the index value and keyword based on the frequency at which each of the keywords appears in the sequentially inputted text, the keywords already searched out as those to determine each event; and
a display for displaying, for a speaker of the conversation in progress, at least one of the index value indicating the possibility of an occurrence of each event and the keyword that should be spoken in order for the desired event to occur.

9. A method for causing a computer to search a plurality of texts of recorded conversations to determine keywords leading to an event occurrence, the texts each having a progress leading up to the event occurrence recorded therein, the method comprising the steps of:
inputting, for each of the plurality of texts, a plurality of subtexts which are obtained by selecting parts corresponding to a plurality of predetermined sections from the texts while associating the subtexts with events which occurred through the process recorded in the texts; and
when a plurality of event prediction devices are provided corresponding to the plurality of sections respectively, the prediction devices each outputting a prediction result of an event occurring through the process recorded in a corresponding one of the subtexts, the prediction result based on the appearance frequency of each word in the corresponding subtext,
adjusting the corresponding event prediction devices, for each of the plurality of sections, to maximize the percentage of agreeing texts to a first text group selected from the plurality of corresponding subtexts, the agreeing texts each indicating the content in which the inputted event agrees with the prediction result;
for each of the plurality of sections, selecting a second text group, which is different from the first text group, from the plurality of subtexts corresponding to the section, and then by inputting each text of the second text group in the adjusted event prediction device corresponding to the section, and generating the prediction result; and
calculating the prediction precision for the second text group of the event prediction device of each of the sections, the prediction precision based on a comparison result between the inputted event and the prediction result for each subtext, for searching for keywords in a section which have a higher degree of prediction precision than a predetermined reference value, and for outputting the keywords,
and wherein the adjusting comprises randomly selecting the first text group from the plurality of subtexts corresponding to each of the plurality of sections, and
wherein the selecting of the second text group comprises selecting the plurality of subtexts corresponding to each of the plurality of sections, by excluding the first text group from the subtexts.

10. A program storage device storing a program for causing a computer to function as a system for searching a plurality of texts of recorded conversations for determining keywords that lead to an event occurrence, the texts each having a progress leading up to the event occurrence recorded therein, the program causing the computer to function as:
a text input unit for inputting a plurality of subtexts while associating each of the subtexts with an event occurring through the process recorded in each of the texts, the subtexts obtained by selecting parts corresponding to each of a plurality of predetermined sections in each of the plurality of texts;
an event prediction device provided corresponding to the plurality of sections respectively, the prediction devices each outputting a prediction result of an event occurring through the process recorded in the subtexts corresponding to the prediction device, the prediction result based on the appearance frequency of each word in the subtexts;
a prediction device adjuster for adjusting the event prediction device corresponding to each of the plurality of sections, so as to maximize the percentage of agreeing texts to a first text group selected from the plurality of corresponding subtexts, the agreeing texts each indicating the content in which the inputted event agrees with the prediction result;
a plurality of prediction processors for generating the prediction result for each of the plurality of sections, by selecting a second text group, which is different from the first text group, from the plurality of subtexts corresponding to the section, and then by inputting each text of the second text group in the adjusted event prediction device corresponding to the section; and
a search unit for calculating the prediction precision for the second text group of the event prediction device of each of the sections, the prediction precision based on a comparison result between the inputted event and the prediction result for each subtext, for searching for keywords in a section which have a higher degree of prediction precision than a predetermined reference value, and for outputting the keywords
wherein the prediction device adjuster randomly selects the first text group from the plurality of subtexts corresponding to each of the plurality of sections, and
the prediction processor selects, as the second text group, some of the plurality of subtexts corresponding to each of the plurality of sections, by excluding the first text group from the subtexts.

* * * * *